July 7, 1931.  J. H. NEWPORT  1,813,253
WATER HEATER
Filed Oct. 5, 1928
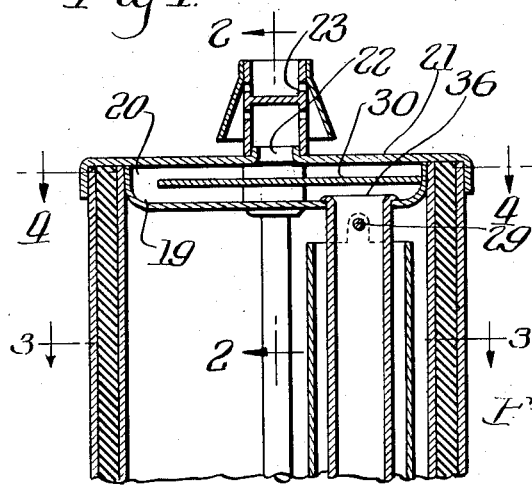
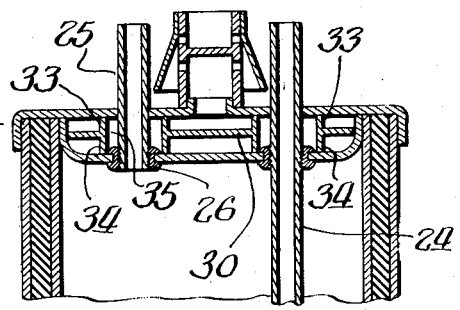
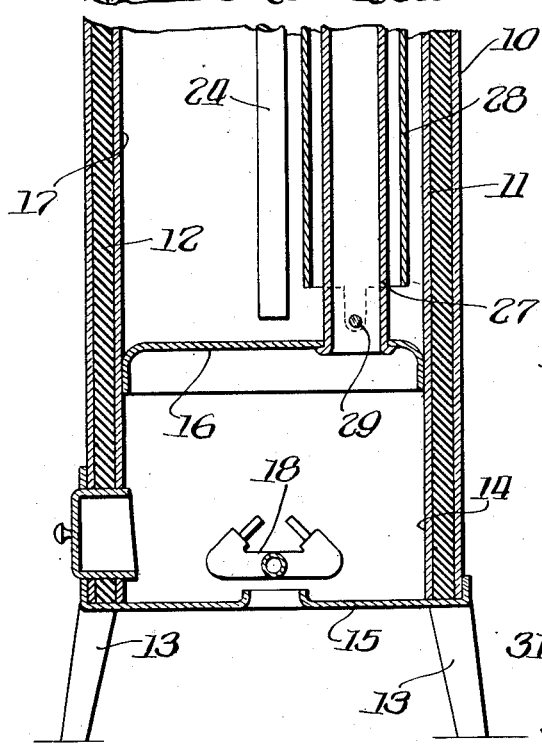
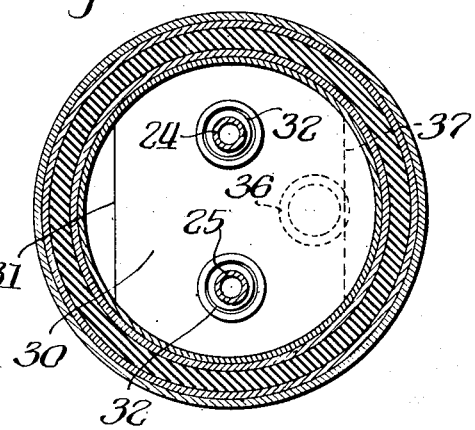
Witness
William P. Kilroy
Inventor
Jesse H. Newport
By George J. Haight
Atty.

Patented July 7, 1931

1,813,253

UNITED STATES PATENT OFFICE

JESSE H. NEWPORT, OF KENILWORTH, ILLINOIS

WATER HEATER

Application filed October 5, 1928. Serial No. 310,504.

This invention relates to water heaters.

An object of the invention is to provide a heater including a water tank and a heat source, wherein means are provided for efficiently and economically heating the water contained within the tank.

Another object of the invention is to provide a water heater of the character referred to including an outer insulated casing having a central discharge vent in its top, the casing enclosing a water tank and heat source, together with a flue for the products of combustion which is so positioned as to extend from the tank at one side thereof out of line with said vent, and wherein a baffle member is interposed between the outlet of the flue and the vent to impede the escape of the products of combustion and provide for efficient heating of the water.

A still further object of the invention is to provide a baffle member of the character mentioned, wherein the baffle member is adjustable to vary the degree to which the products of combustion are impeded in their escape from the heater.

A more particular object of the invention is to provide a baffle member which may be utilized in connection with the water pipes leading to the tank, and wherein the baffle member has means for supporting the same in position as to provide an air space between the baffle member and the pipes.

Other and further objects of the invention will more clearly appear from the description and claims hereinafter following.

In the drawings forming a part of this specification, Figure 1 is a vertical sectional view taken centrally through the heater. Figure 2 is a vertical sectional fragmentary view corresponding substantially to the upper portion of the heater structure shown in Figure 1, the section being taken substantially on the line 2—2 of Figure 1. Figure 3 is a horizontal sectional view corresponding substantially to the line 3—3 of Figure 1. And Figure 4 is a horizontal sectional view through the upper portion of the heater taken substantially on the line 4—4 of Figure 1.

As shown in the drawings, 10 represents an outer casing and 11 an inner casing, there being insulating material 12 interposed between the two casing members, as shown. The lower portions of the casing members are supported upon legs 13—13. A fire pot or combustion chamber 14 is defined by the lower portion of the inner wall 11, by a bottom plate 15 and by the bottom wall 16 of the water chamber 17. A burner 18 is disposed centrally within the combustion chamber 14. The upper end of the water tank or chamber 17 is defined by a top member 19 disposed in a direction opposite to the bottom 16, posed in a direction opposite to the bottom 16, so as to provide a cup-shaped depression 20 closed at the top by a wall 21, as shown.

The top wall 21 is provided with a discharge aperture 22 which communicates with a hooded vent pipe 23, the aperture 22 being centrally located. Also extending through the top wall 21 of the casing, as well as through the top 19 of the water chamber, is an inlet pipe 24 and an outlet pipe 25, these pipes being suitably secured in the top member 19 by flanged members 26, as best shown in Figure 2. The pipes 24 and 25 are disposed centrally at opposite sides of the tank 17, as best shown in Figure 4.

Extending through the tank 17 is a flue 27 communicating with the combustion chamber 14, and with the chamber formed between the walls 19 and 21 at the top of the heater. Surrounding the flue 27 within the water compartment is a tubular member 28, the same being secured in position by rivets, as indicated at 29, the tube providing a space next to the flue within which the water circulates.

In order to impede the escape of the products of combustion from the heater, a baffle member 30 is provided. The baffle member preferably is of circular shape, as best shown in Figure 4, with a cut-out segment 31 at one edge, the diameter of the member 30 being of such character as to closely fit the defining walls of the compartment 20, except at the cut-out edge thereof. The baffle member 30 is provided with apertures 32—32, these apertures being arranged so as to be disposed about the pipes 24 and 25, the apertures being of somewhat larger diameter than the pipes. The peripheries of the baffle member defining the apertures 32—32 are flanged, as indicated at 33 and 34, to provide continuous circular ribs or flanges surrounding each aperture at opposite sides of the baffle member. The flange 34 of the baffle member rests against the top 19 of the water chamber and is disposed about the adjacent member 26, securing one of the pipes in position, the flange 34 serving to space the baffle member upwardly from the wall 19 of the heater. The flange 33 of each aperture extends from the baffle member proper to the undersurface of the wall 21 at the top of the heater. Due to this arrangement a dead air space, indicated at 35, is provided surrounding each of the pipes 24 and 25. The cut-out portion 31 of the baffle member 30 is normally disposed so as to be located at the side of the heater opposite to the outlet 36 of the flue 27. If desired, the baffle member 30 may be reversed in position, so as to place the segmental cut-out portion closer to the outlet 36 of the flue 27.

In operation, assuming the tank or water chamber 17 to be filled with water, and it is desired to heat the water therein, the burner 18 is energized, the products of combustion passing upwardly and impinging upon the bottom wall 16 of the tank, and passing thence upwardly through the flue 27, emerging at the outlet 36. When the baffle member 30 is in the position shown in Figure 1, the products of combustion impinge against the undersurface of the baffle member and pass transversely beneath the same, heating the top wall 19 of the tank and passing upwardly through the segmental cut-out portion 31, and thence outwardly through the vent opening 22. By reason of this construction, the products of combustion are impeded in their escape from the heater and utilized to the fullest extent in giving up the heat units to the water in the tank, the latter, of course, being withdrawn, as desired. Due to the disposition of the flue 27 at one side of the tank, and the fact that the flue is immediately surrounded by a body of water relatively thin in cross section, this water is quickly heated, passing upwardly, making way for the colder water, and hence inducing circulation of the water and more rapid heating thereof. The baffle member prevents the products of combustion from quickly passing out of the vent, which would result in great loss of efficiency, and at the same time does not interfere with the necessary draught. Also due to the provision of the dead air spaces which surround the pipes 24 and 25, these pipes are insulated from the intense heat energy to which they normally would be subjected, overcoming the tendency of the pipes to become clogged should lime be present in the water. The baffle member 30, due to its reversibility, may be utilized to impede the products of combustion to a less extent than when positioned, as shown in Figure 1, when this becomes necessary, due to faulty venting conditions in the flue with which the vent pipe 23 communicates, the adjustment or repositioning of the baffle member being effected merely by reversing the cut-out portion 31 so as to be disposed only slightly out of line with the outlet 36 of the flue 27.

While I have herein shown and described what I now consider the preferred manner of carrying out my invention, the same is merely illustrative and I contemplate all changes and modifications that come within the scope of the claims appended hereto.

I claim:

1. In a heater of the character described, the combination with a heat source and a receptacle having a cup-shaped member adjacent its top; of enclosing means cooperating with said cup-shaped member to provide a chamber having a vent; a pipe extending through said chamber into said receptacle; means providing a flue communicating with said heat source and said chamber; and a baffle member located within said chamber and having an aperture for the reception of said pipe, said aperture being defined by flanges providing an air space about said pipe, said flanges serving to support said baffle member in position intermediate the outlet of said flue and said vent.

2. In a heater of the character described, the combination with a receptacle and a heat source and means enclosing the same, said means providing a chamber at the top of said heater having a vent therefrom; a flue extending from said heat source to said chamber; a pipe communicating with said receptacle and extending through said chamber; a baffle member disposed in said chamber and provided with an aperture through which said pipe extends, said aperture being larger than the pipe and having elements defining an air space about said pipe; and means for spacing said elements to insure equal spacing of the same around said pipe.

3. In a heater of the character described including a water receptacle, the combination with a heat source and means enclosing the same, said means providing a chamber at the top of said heater and having a vent therefrom; a flue extending from said heat source to said chamber and discharging therein; a pipe extending through said chamber and communicating with said water receptacle; and a baffle member interposed between the outlet of said flue and said vent, said baffle member having flanges on the periphery of an aperture therein through which aperture and flanges said pipe extends, said flanges cooperating with the walls defining said chamber to provide an air space about said pipe.

In witness that I claim the foregoing I have hereunto subscribed my name this 26th day of September, 1928.

JESSE H. NEWPORT.